United States Patent
Defrancisci et al.

(10) Patent No.: US 11,753,522 B2
(45) Date of Patent: Sep. 12, 2023

(54) USE OF MAGNESIUM OXIDE FOR CROSSLINKING POLYMERS

(71) Applicant: Arkema France, Colombes (FR)

(72) Inventors: Alfredo Defrancisci, Pierre Benite (FR); Leonard Palys, King of Prussia, PA (US); Peter Dluzneski, King of Prussia, PA (US)

(73) Assignee: Arkema France, Colombes (FR)

( * ) Notice: Subject to any disclaimer, the term of this patent is extended or adjusted under 35 U.S.C. 154(b) by 271 days.

(21) Appl. No.: 16/975,863

(22) PCT Filed: Feb. 27, 2019

(86) PCT No.: PCT/FR2019/050445
§ 371 (c)(1),
(2) Date: Aug. 26, 2020

(87) PCT Pub. No.: WO2019/166737
PCT Pub. Date: Sep. 6, 2019

(65) Prior Publication Data
US 2021/0002454 A1    Jan. 7, 2021

(30) Foreign Application Priority Data
Feb. 27, 2018    (FR) ....................... 1851721

(51) Int. Cl.
*C08K 3/22*        (2006.01)
*C08K 5/098*      (2006.01)
(Continued)

(52) U.S. Cl.
CPC ............... *C08K 3/22* (2013.01); *C08K 5/098* (2013.01); *C08K 5/14* (2013.01); *C08L 23/16* (2013.01);
(Continued)

(58) Field of Classification Search
CPC .... C08K 5/098; C08K 5/14; C08K 2003/222; C08K 2003/2296; C08K 3/22; C08L 23/16; C08L 2205/03; C08L 9/00
(Continued)

(56) References Cited

U.S. PATENT DOCUMENTS 4,843,114 A    6/1989  Touchet et al.
5,227,425 A    7/1993  Rauline
(Continued)

FOREIGN PATENT DOCUMENTS

CN    103772743 A    5/2014
CN    104448765 A    3/2015
(Continued)

OTHER PUBLICATIONS

International Search Report and Written Opinion for International Application No. PCT/FR2019/050445, dated Jun. 17, 2019, 9 pages.

*Primary Examiner* — Frances Tischler
(74) *Attorney, Agent, or Firm* — RatnerPrestia (57) ABSTRACT

The use of magnesium oxide for increasing the rate of crosslinking and/or the crosslinking density of at least one crosslinkable polymer is described in addition to a composition that can be employed in this use, comprising: from 30 to 80% by weight of a crosslinking co-agent, from 0.5 to 10% by weight of an organic peroxide, from 15 to 60% by weight of magnesium oxide, and from 0 to 40% by weight of one or more crosslinkable polymers. An article obtained from this composition is also described.

16 Claims, 4 Drawing Sheets

(51) Int. Cl.
*C08K 5/14* (2006.01)
*C08L 23/16* (2006.01)

(52) U.S. Cl.
CPC ............... *C08K 2003/222* (2013.01); *C08K 2003/2296* (2013.01); *C08L 2205/03* (2013.01)

(58) Field of Classification Search
USPC ............................................................ 524/432
See application file for complete search history.

(56) References Cited

U.S. PATENT DOCUMENTS

| | | | |
|---|---|---|---|
| 5,852,009 | A | 12/1998 | Vanel |
| 5,900,449 | A | 5/1999 | Custodero et al. |
| 5,977,238 | A | 11/1999 | Labauze |
| 6,013,718 | A | 1/2000 | Cabioch et al. |
| 6,057,395 | A | 5/2000 | Nishimura |
| 6,128,179 | A | 10/2000 | Morokuma |
| 6,313,213 | B1 * | 11/2001 | Nakamura ............... C08L 9/00 524/505 |
| 6,420,488 | B1 | 7/2002 | Penot |
| 6,503,973 | B2 | 1/2003 | Robert et al. |
| 6,536,492 | B2 | 3/2003 | Vasseur |
| 6,815,473 | B2 | 11/2004 | Robert et al. |
| 6,875,506 | B2 | 4/2005 | Husemann et al. |
| 7,199,175 | B2 | 4/2007 | Vasseur |
| 7,300,970 | B2 | 11/2007 | Durel et al. |
| 7,491,767 | B2 | 2/2009 | Durel et al. |
| 7,820,771 | B2 | 10/2010 | Lapra et al. |
| 8,344,063 | B2 | 1/2013 | Marechal et al. |
| 8,455,584 | B2 | 6/2013 | Robert et al. |
| 8,461,269 | B2 | 6/2013 | Varagniat et al. |
| 8,492,479 | B2 | 7/2013 | Robert et al. |
| 8,883,929 | B2 | 11/2014 | Gandon-Pain et al. |
| 9,670,291 | B2 | 6/2017 | Marechal et al. |
| 9,718,309 | B2 | 8/2017 | Vasseur et al. |
| 2005/0239639 | A1 | 10/2005 | Monteil et al. |
| 2006/0089445 | A1 | 4/2006 | Gandon-Pain |
| 2009/0270558 | A1 | 10/2009 | Gandon-Pain et al. |
| 2015/0259520 | A1 * | 9/2015 | Kobayashi ............... C08K 3/08 524/291 |

FOREIGN PATENT DOCUMENTS

| | | |
|---|---|---|
| CN | 104795149 A | 7/2015 |
| EP | 0501227 A1 | 9/1992 |
| EP | 0735088 A1 | 10/1996 |
| EP | 0810258 A1 | 12/1997 |
| EP | 1127909 A1 | 8/2001 |
| FR | 2740778 A1 | 5/1997 |
| FR | 2765882 A1 | 1/1999 |
| FR | 3012147 A1 | 4/2015 |
| JP | 2002306637 A | 10/2002 |
| JP | 2006282851 A | 10/2006 |
| WO | 9736724 A2 | 10/1997 |
| WO | 9916600 A1 | 4/1999 |
| WO | 0005300 A1 | 2/2000 |
| WO | 0005301 A1 | 2/2000 |
| WO | 0192402 A1 | 12/2001 |
| WO | 0210269 A2 | 2/2002 |
| WO | 03002648 A1 | 1/2003 |
| WO | 03002649 A1 | 1/2003 |
| WO | 2004035639 A1 | 4/2004 |
| WO | 2004096865 A2 | 11/2004 |
| WO | 2006060792 A1 | 7/2006 |
| WO | 2006069793 A1 | 7/2006 |
| WO | 2008003434 A1 | 1/2008 |
| WO | 2008003435 A1 | 1/2008 |
| WO | 2008141702 A1 | 11/2008 |
| WO | 2009000750 A1 | 12/2008 |
| WO | 2009000752 A1 | 12/2008 |
| WO | 2011042507 A1 | 4/2011 |
| WO | 2017203124 A1 | 11/2017 |

* cited by examiner

USE OF MAGNESIUM OXIDE FOR CROSSLINKING POLYMERS

CROSS-REFERENCE TO RELATED APPLICATIONS

This is the national phase of International Application No. PCT/FR2019/050445, filed 27 Feb. 2019, which claims priority to French Application No. 1851721, filed 27 Feb. 2018. The disclosure of each of these applications is incorporated herein by reference in its entirety for all purposes.

FIELD OF THE INVENTION

The present invention relates to a new use of magnesium oxide in the crosslinking of crosslinkable polymers, as well as to a composition adapted for the implementation of this use.

TECHNICAL BACKGROUND

It is known that the crosslinking of crosslinkable polymers imparts advantageous properties to products such as pipes, seals, belts, sporting goods or insulators, such as better elasticity and improved wear resistance.

Document CN 104795149 describes a process for manufacturing sheaths for communication cables in coal mines comprising the vulcanisation of a composition containing in particular chloroprene rubber, chlorinated polyethylene, ethylene-butylene rubber, magnesium oxide, dicumyl peroxide, 2,5-dimethyl-2,5-bis(tert-butylperoxy) hexane and zinc acrylate.

Document CN 103772743 discloses compositions comprising ethylene-propylene-diene rubber monomer (EPDM), dicumyl peroxide or diisopropylbenzene peroxide, zinc methacrylate and magnesium oxide, subjected to vulcanisation.

Document JP 2002306637 relates to the manufacture of golf balls. It discloses vulcanised rubber compositions comprising a metal salt of α,β-unsaturated carboxylic acid, an organic peroxide, and zinc oxide or magnesium oxide, zinc acrylate being preferred among the metal salts of α,β-unsaturated carboxylic acid.

U.S. Pat. No. 6,057,395 discloses compositions containing a hydrogenated butadiene-acrylonitrile rubber (HNBR) or a butadiene-acrylonitrile rubber (NBR) or a styrene-butadiene copolymer (SBR) or a polybutadiene (BR) or a natural rubber (NR) or of EPDM, zinc methacrylate, magnesium oxide and a peroxide (1,3-bis(tert-butylperoxyisopropyl)benzene). These rubber compositions are vulcanised and can be used for rollers, belts, seals, tyres, vibration isolators and hoses.

U.S. Pat. No. 4,843,114 describes vulcanisable compositions for tracks of military tanks containing nitrilated polymers, a metal oxide selected from zinc oxide and magnesium oxide, a zinc methyl methacrylate or dimethyl methacrylate resin and a hardening agent selected from dicumyl peroxide, its derivatives, sulphur and a sulphur donor.

Document FR 3012147 describes compositions for tyres comprising a diene elastomer, a derivative of zinc diacrylate and a peroxide.

There is a need to provide systems for crosslinking rubber composition or the like allowing to obtain an improved crosslinking density and/or crosslinking rate.

SUMMARY OF THE INVENTION

The invention relates firstly to the use of magnesium oxide to increase the crosslinking rate and/or the crosslinking density of at least one crosslinkable polymer.

According to embodiments, the crosslinkable polymer is free of chlorine functional groups and of carboxylic acid functional groups, preferably free of halogen functional groups and carboxylic acid functional groups.

According to embodiments, the crosslinkable polymer is selected from the group consisting of diene elastomers, saturated polyolefins, silicones, fluorinated elastomers, ethylene-vinyl acetate copolymers, ethylene methyl (meth) acrylate copolymers, ethylene-glycidyl methacrylate copolymers and/or mixtures thereof, preferably the crosslinkable polymer is a diene elastomer, more preferably selected from the group consisting of polybutadienes, synthetic polyisoprenes, natural rubber, butadiene copolymers, particularly butadiene and styrene copolymers and butadiene and acrylonitrile copolymers, isoprene copolymers, particularly isoprene and styrene copolymers, and mixtures of these elastomers.

According to embodiments, the crosslinking of the crosslinkable polymer is carried out in the presence of:
- a crosslinking co-agent, preferably selected from the group consisting of (meth)acrylate compounds, maleimide compounds, allyl compounds, vinyl compounds and mixtures thereof, and
- an organic peroxide.

According to embodiments, the organic peroxide is selected from dicumyl peroxide, aryl or diaryl peroxides, diacetyl peroxide, benzoyl peroxide, dibenzoyl peroxide, ditertbutyl peroxide, tertbutylcumyl peroxide, 2,5-bis(tert-butylperoxy)-2,5-dimethylhexane, n-butyl-4,4'-di(tert-butylperoxy) valerate, OO-(t-butyl)-O-(2-ethylhexyl) monoperoxycarbonate, tert-butyl peroxyisopropylcarbonate, tert-butyl peroxybenzoate, tert-butyl peroxy-3,5,5-trimethylhexanoate, 1,3(4)-bis(tert-butylperoxyisopropyl)benzene and mixtures thereof.

According to embodiments, the crosslinking co-agent comprises a (meth)acrylate compound, in the form of a metal salt, or an ester or in a polymeric form, and preferably is a zinc salt of formula (I):

wherein $R_1$, $R_2$, $R_3$, $R_4$, $R_5$ and $R_6$ independently represent a hydrogen atom or a C1-C7 hydrocarbon group selected from linear, branched or cyclic alkyl groups, aralkyl groups, alkylaryl groups and aryl groups, and optionally interrupted by one or more heteroatoms, $R_2$ and $R_3$ on the one hand and $R_5$ and $R_6$ on the other hand being able to independently form a non-aromatic ring, and even more preferably a zinc salt of formula (II):

wherein $R_1$, $R_2$ and $R_3$ independently represent a hydrogen atom or a C1-C7 hydrocarbon group selected from linear, branched or cyclic alkyl groups, aralkyl groups, alkylaryl groups and aryl groups, and optionally interrupted by one or more heteroatoms, $R_2$ and $R_3$ being able to form a non-aromatic ring.

According to embodiments, $R_1$, $R_2$, $R_3$, $R_4$, $R_5$ and $R_6$ in the formula (I) or $R_1$, $R_2$, $R_3$ in the formula (II) independently represent a hydrogen atom or a methyl group.

According to embodiments, the metal salt is zinc diacrylate or zinc dimethacrylate.

According to embodiments, the crosslinking co-agent is used in a mass quantity of 5 to 50 phr, preferably from 10 to 30 phr.

According to embodiments, the organic peroxide is used in a mass quantity from 0.1 to 10 phr, preferably from 0.4 to 6 phr.

According to embodiments, the magnesium oxide is used in a mass quantity comprised from 1 to 50 phr, preferably from 2 to 30 phr.

According to embodiments, the magnesium oxide has a BET specific surface area ranging from 1 to 200 m²/g, preferably from 5 to 170 m²/g.

According to embodiments, the magnesium oxide has a BET specific surface area greater than 25 m²/g.

According to embodiments, the crosslinking of the crosslinkable polymer is carried out in the presence of a reinforcing filler, preferably carbon black, silica or a mixture thereof.

According to embodiments, the crosslinking of the crosslinkable polymer is carried out in the presence of a processing agent, preferably zinc oxide; and/or in the presence of a plasticiser, an antioxidant, a stabiliser or a mixture thereof.

According to embodiments, the use according to the invention allows to obtain a crosslinking density greater than 1.5 times, preferably 2 times, 3 times, 5 times, 10 times, 20 times, 50 times or 100 times the crosslinking density obtained under the same crosslinking conditions but in the absence of magnesium oxide.

According to embodiments, the use according to the invention allows to obtain a crosslinking rate greater than 1.1 times, preferably 1.2 times, 1.3 times, 1.4 times, 1.5 times, 1.8 times or 2 times the crosslinking rate obtained under the same crosslinking conditions but in the absence of magnesium oxide.

According to embodiments, the use according to the invention is for the manufacture of hoses, pipes, seals, O-rings, transmission belts, engine mounts, anti-vibration systems, window profiles, car body and window sealing profiles, insulators for electric cables, shoe soles, rubber mats, conveyor belts and/or golf balls.

The invention also relates to a composition comprising:
from 30 to 80% by mass of a crosslinking co-agent, preferably a zinc salt of formula (I):

wherein $R_1$, $R_2$, $R_3$, $R_4$, $R_5$ and $R_6$ independently represent a hydrogen atom or a C1-C7 hydrocarbon group selected from linear, branched or cyclic alkyl groups, aralkyl groups, alkylaryl groups and aryl groups, and optionally interrupted by one or more heteroatoms, $R_2$ and $R_3$ on the one hand and $R_5$ and $R_6$ on the other hand being able to independently form a non-aromatic ring, even more preferably a zinc salt of formula (II):

wherein $R_1$, $R_2$ and $R_3$ independently represent a hydrogen atom or a C1-C7 hydrocarbon group selected from linear, branched or cyclic alkyl groups, aralkyl groups, alkylaryl groups and aryl groups, and optionally interrupted by one or more heteroatoms, $R_2$ and $R_3$ can form a non-aromatic ring,
from 0.5 to 10% by mass of an organic peroxide,
from 15 to 60% by mass of magnesium oxide, and
from 0 to 40% by mass of one or more crosslinkable polymers.

According to embodiments, the crosslinking co-agent is as described above, and/or the organic peroxide is as defined above; and/or the magnesium oxide is as defined above; and/or the crosslinkable polymer is as defined above.

According to embodiments, the crosslinking co-agent, the organic peroxide and the magnesium oxide are present in mass ratios from 5 to 50 parts of crosslinking co-agent for 0.1 to 10 parts of organic peroxide and for 1 to 50 parts of magnesium oxide; and preferably from 10 to 30 parts of crosslinking co-agent for 0.4 to 6 parts of organic peroxide and for 2 to 30 parts of magnesium oxide.

According to embodiments, the composition essentially consists of, preferably consists of, the crosslinking co-agent, preferably the zinc salt of formula (I), even more preferably the zinc salt of formula (II), the organic peroxide, the magnesium oxide and optionally the crosslinkable polymer.

According to embodiments, the composition is in the form of powder granules comprising the crosslinking co-agent, preferably the zinc salt of formula (I), even more preferably the zinc salt of formula (II), the organic peroxide and the magnesium oxide, at least partly coated with the crosslinkable polymer.

The invention also relates to the use of a composition as described above for the manufacture of all or part of an article such as a hose, a pipe, a seal, an O-ring, a transmission belt, an engine mount, an anti-vibration system, a window profile, a car body and window sealing profile, an insulator for electric cables, a shoe sole, a rubber mat, a conveyor belt and/or a golf ball.

The invention also relates to an article, such as a hose, a pipe, a seal, an O-ring, a transmission belt, an engine mount, an anti-vibration system, a window profile, a car body and window sealing profile, an insulator for electric cables, a shoe sole, a rubber mat, a conveyor belt and/or a golf ball, all or part of which is obtained by crosslinking of a crosslinkable composition made from a composition as defined above.

The present invention meets the need expressed above. More particularly it provides a crosslinking system having one or both of the following advantages: an increase in the crosslinking density and an increase in the crosslinking rate. Such a system allows to obtain final products with advantageous mechanical properties, and in particular an increase in the modulus of elasticity in traction, very particularly at relatively low elongation (such as an elongation of 10%, or 50%, or 100%, or 200%).

Also it allows to accelerate crosslinking and thus saves time in the manufacture of finished or semi-finished products.

This is accomplished thanks to the use of magnesium oxide during crosslinking. It has surprisingly been found that a very significant increase in the crosslinking density and/or the crosslinking rate has been obtained by the addition of magnesium oxide in a crosslinking process, this effect not being observed with, for example, the addition of zinc oxide in the same process.

DESCRIPTION OF EMBODIMENTS OF THE INVENTION

The invention is now described in more detail and without limitation in the description which follows.

In the present description, unless expressly indicated otherwise, all the percentages (%) indicated are percentages by mass.

In the present application, the expression "phr" means in a known manner parts by weight per hundred parts by weight of elastomers (or other crosslinkable polymers). The amount by weight of the constituents of the compositions relative to the total amount of elastomers (or other crosslinkable polymers) is thus expressed by weight considered by convention to the value hundred.

The invention relates to the use of magnesium oxide to increase the crosslinking rate and/or the crosslinking density of at least one crosslinkable polymer.

This use of magnesium oxide involves adding magnesium oxide to the composition comprising the crosslinkable polymer, and then crosslinking this crosslinkable polymer.

In a particularly preferred manner, the composition also comprises, and therefore the use of magnesium oxide is carried out in the presence of:
  a crosslinking co-agent, preferably a metal salt of formula (I) and more preferably of formula (II); and
  an organic peroxide.

"Crosslinking" means the formation of a three-dimensional network by creating bonds between the molecules of crosslinkable polymers. The use according to the invention is therefore preferably carried out in the context of a crosslinking process, during which the crosslinking takes place.

Crosslinkable Polymers

Preferably, the crosslinkable polymer is an elastomer.

According to a particular embodiment, the crosslinkable polymer is selected from the group consisting of diene elastomers, saturated polyolefins (in particular linear low density polyethylenes, low density polyethylenes, high density polyethylenes, ethylene-propylene copolymers), silicones, fluorinated elastomers, ethylene-vinyl acetate copolymers, ethylene methyl (meth)acrylate copolymers, ethylene-glycidyl methacrylate copolymers and/or mixtures thereof.

Preferably the crosslinkable polymer comprises or is a diene elastomer.

"Diene elastomer" means an elastomer (or more) derived at least in part (homopolymer or copolymer) from diene monomers (monomers carrying two carbon-carbon double bonds, conjugated or not).

A distinction is made between diene elastomers having —Cl or —COOH (carboxylic acid) functional groups, such as polychloroprene, and diene elastomers free of such functional groups.

Diene elastomers free such functional groups are preferred. It is therefore preferred that the composition implemented in the context of the invention is free of diene elastomer having —Cl or —COOH functional groups. More generally, it is preferred that the composition used in the context of the invention is free of diene elastomer having halogen or —COOH functional groups.

Magnesium oxide is capable of acting as a crosslinking agent as such on diene elastomers provided with such functional groups, which act as crosslinking sites. Consequently, preferably, in the context of the invention, magnesium oxide is not used as a crosslinking agent as such.

Diene elastomers can also be classified in a known manner into two categories, those called essentially unsaturated and those called essentially saturated. These two categories of diene elastomers can be considered in the context of the invention.

An essentially saturated diene elastomer has a low or very low proportion of units of diene origin (conjugated dienes) less than 15% (in moles). Thus, for example, butyl rubbers or diene and alpha-olefin copolymers such as EPDM fall within the definition of essentially saturated diene elastomers.

Conversely, "essentially unsaturated diene elastomer" means a diene elastomer derived at least in part from conjugated diene monomers, having a proportion of units of diene origin (conjugated dienes) which is greater than 15% (in moles). In the category of essentially unsaturated diene elastomers, "highly unsaturated diene elastomer" particularly means a diene elastomer having a proportion of units of diene origin (conjugated dienes) which is greater than 50% (in moles).

Diene elastomer capable of being used in the invention more particularly means:

(a) any homopolymer obtained by polymerisation of a conjugated diene monomer having from 4 to 12 carbon atoms;

(b) any copolymer obtained by copolymerisation of one or more dienes conjugated together or with one or more vinyl aromatic compounds having from 8 to 20 carbon atoms;

(c) any ternary copolymer obtained by copolymerisation of ethylene, of an α-olefin having from 3 to 6 carbon atoms with a non-conjugated diene monomer having from 6 to 12 carbon atoms, such as for example the elastomers obtained from ethylene, propylene with a non-conjugated diene monomer of the aforementioned type such as in particular 1,4-hexadiene, ethylidene norbornene, dicyclopentadiene; such polymers are particularly described in documents WO 2004/035639 and US 2005/0239639;

(d) any copolymer of isobutene and isoprene (butyl rubber), as well as the halogenated, particularly chlorinated or brominated, versions of this type of copolymers.

Diene elastomers of the highly unsaturated type, particularly of the type (a) or (b) above are preferred.

As conjugated dienes, in particular 1,3-butadiene, 2-methyl-1,3-butadiene, 2,3-di(C1-C5 alkyl)-1,3-butadienes such as for example 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene, 2,4-hexadiene are suitable. As vinyl aromatic compounds for example styrene, ortho-, meta-, para-methylstyrene, vinyl toluene, para-tertbutylstyrene, methoxystyrenes, chlorostyrenes, vinyl mesitylene, divinylbenzene, vinylnaphthalene are suitable.

The copolymers can contain between 99% and 20% by weight of diene units and between 1% and 80% by weight of vinyl aromatic units. The elastomers can have any microstructure which depends on the polymerisation conditions used, in particular the presence or absence of a modifying and/or randomising agent and the amounts of randomising modifying agent used. The elastomers can be, for example, block, statistical, sequenced, microsequenced elastomers, and be prepared in dispersion, in emulsion or in solution; they can be coupled and/or star-branched or else functionalised with a coupling and/or star-branching or functionalising agent. For coupling to carbon black, mention may be made, for example, of functional groups comprising a C—Sn bond or amino functional groups such as aminobenzophenone for example; for coupling to a reinforcing inorganic filler such as silica, mention may, for example, be made of silanol or polysiloxane functional groups having a silanol end (as described for example in documents FR 2740778, U.S. Pat. No. 6,013,718 and WO 2008/141702), alkoxysilane groups (as described for example in documents FR 2765882 or U.S. Pat. No. 5,977,238), carboxylic groups (as described for example in documents WO 01/92402 or U.S. Pat. No. 6,815,473, WO 2004/096865 or US 2006/0089445) or else polyether groups (as described for example in documents EP 1127909, U.S. Pat. No. 6,503,973, WO 2009/000750 and WO 2009/000752). As other examples of functionalised elastomers, mention may also be made of elastomers, such as isoprene-styrene copolymers (SBR), polybutadienes (BR), natural rubber (NR) or synthetic polyisoprenes (IR), of the epoxidised type.

These functionalised elastomers can be used in a blend with one another or with non-functionalised elastomers. For example, it is possible to use a functionalised silanol or polysiloxane elastomer having a silanol end, in admixture with an elastomer coupled and/or star-branched with tin (described in document WO 2011/042507), the latter having a proportion comprised from 5 to 50% by mass, for example from 25 to 50%.

Polybutadienes are suitable and in particular those having a content (molar %) in units -1,2 comprised between 4% and 80% or those having a content (molar %) of cis-1,4 greater than 80%, polyisoprenes, butadiene-styrene copolymers and particularly those having a glass transition temperature (Tg) comprised between 0° C. and −70° C. and more particularly between −10° C. and −60° C., a styrene content comprised between 5% and 60% by weight and more particularly between 20% and 50%, a content (molar %) of -1,2 bonds of the butadiene portion comprised between 4% and 75%, a content (molar %) of trans-1,4 bonds comprised between 10% and 80%, butadiene-isoprene copolymers and in particular those having an isoprene content comprised between 5% and 90% by weight and a Tg of −40° C. to −80° C., the isoprene-styrene copolymers and in particular those having a styrene content comprised between 5% and 50% by weight and a Tg comprised between −5° C. and −60° C. In the case of butadiene-styrene-isoprene copolymers, in particular those having a styrene content comprised between 5% and 50% by weight and more particularly between 10% and 40%, an isoprene content comprised between 15% and 60% by weight and more particularly between 20% and 50%, a butadiene content comprised between 5% and 50% by weight and more particularly comprised between 20% and 40%, a content (molar %) in units -1,2 of the butadiene portion comprised between 4% and 85%, a content (molar %) in units trans -1,4 of the butadienic portion comprised between 6% and 80%, a content (molar %) in units -1,2 plus -3,4 of the isoprene portion comprised between 5% and 70% and a content (molar %) in units trans -1,4 of the isoprene portion comprised between 10% and 50%, and more generally any butadiene-styrene-isoprene copolymer having a Tg comprised between −20° C. and −70° C. are suitable.

Throughout the present application, the Tg is measured according to standard ASTM D3418.

In summary, the diene elastomer in the composition is preferably selected from the group of highly unsaturated diene elastomers constituted by polybutadienes (BR), synthetic polyisoprenes (IR), natural rubber (NR), butadiene copolymers, isoprene copolymers and mixtures of these elastomers. The copolymers are more preferably selected from the group consisting of butadiene-styrene copolymers (SBR), isoprene-butadiene copolymers (BIR), isoprene-styrene copolymers (SIR), isoprene-butadiene-styrene copolymers (SBIR), butadiene-acrylonitrile copolymers (NBR), butadiene-styrene-acrylonitrile copolymers (NSBR) or a mixture of two or more of these compounds.

According to a particular embodiment, the composition includes from 50 to 100 phr of an SBR elastomer, whether it is an SBR prepared in emulsion (ESBR) or an SBR prepared in solution (SSBR).

According to another particular embodiment, the diene elastomer is an SBR/BR blend (mixture).

According to other possible embodiments, the diene elastomer is an SBR/NR (or SBR/IR), BR/NR (or BR/IR), or else SBR/BR/NR (or SBR/BR/IR) blend.

In the case of an SBR (ESBR or SSBR) elastomer, use is made in particular of an SBR having a medium styrene content, for example comprised between 20% and 35% by weight, or a high styrene content, for example from 35 to 45% by weight, a content (molar %) of vinyl bonds in the butadiene portion comprised between 15% and 70%, a content (molar %) of trans-1,4 bonds comprised between 15% and 75% and a Tg comprised between −10° C. and −55° C. Such an SBR can advantageously be used in admixture with a BR preferably having more than 90% (molar %) of cis-1,4 bonds.

In the case of an NBR elastomer, use is made in particular of an NBR having an acrylonitrile content comprised between 15% and 40% by weight, a content (molar %) of vinyl bonds in the butadiene portion comprised between 15% and 70%, a content (molar %) of trans-1,4 bonds comprised between 15% and 75%.

According to a particular embodiment of the invention, the composition comprises a blend of a (one or more) diene elastomer called "high Tg" diene elastomer having a Tg comprised between −70° C. and 0° C. and a (one or more) diene elastomer called diene elastomer with "low Tg" comprised between −110° C. and −80° C., more preferably between −105° C. and −90° C. The high Tg elastomer is preferably selected from the group consisting of SSBR, ESBR, natural rubber, synthetic polyisoprenes (having a proportion (molar %) of cis-1,4 chains preferably greater than 95%), BIR, SIR, SBIR, and mixtures of these elastomers. The low Tg elastomer preferably comprises butadiene units at a proportion (molar %) at least equal to 70%; it preferably consists of a polybutadiene (BR) having a proportion (molar %) of cis-1,4 chains greater than 90%.

According to another particular embodiment of the invention, the composition comprises for example between 30 and 90 phr, particularly between 40 and 90 phr, of a high Tg elastomer in a blend with a low Tg elastomer.

According to another particular embodiment of the invention, the diene elastomer comprises a blend of a BR (as a low Tg elastomer) having a proportion (molar %) of cis-1,4 chains greater than 90%, with one or more SSBR or ESBR (as high Tg elastomer(s)).

Organic Peroxide

The composition from which the crosslinking process is implemented advantageously contains an organic peroxide.

"Organic peroxide" means an organic compound, that is to say containing carbon, including a group —O—O— (two oxygen atoms bonded by a single covalent bond).

During the crosslinking process, the organic peroxide decomposes at its unstable O—O bond into free radicals. These free radicals allow the creation of crosslinking bonds.

According to one embodiment, the organic peroxide is selected from the group consisting of dialkyl peroxides, monoperoxycarbonates, diacyl peroxides, peroxyketals or peroxyesters.

Preferably, the dialkyl peroxides are selected from the group consisting of dicumyl peroxide, di-t-butyl peroxide, t-butylcumyl peroxide, 2,5-dimethyl-2,5-di(t-butylperoxy) hexane, 2,5-dimethyl-2,5-di(t-amylperoxy)-hexane, 2,5-dimethyl-2,5-di(t-butylperoxy)hexyne-3,2,5-dimethyl-2,5-di (t-amylperoxy)hexyne-3, α,α'-di-[(t-butyl-peroxy) isopropyl] benzene, α,α'-di-[(t-amyl-peroxy) isopropyl] benzene, di-t-amyl peroxide, 1,3,5-tri-[(t-butylperoxy)isopropyl]benzene, 1,3-dimethyl-3-(t-butylperoxy)butanol, and 1,3-dimethyl-3-(t-amylperoxy) butanol.

A mixture of dicumyl peroxide and of 1,3 and 1,4-isopropylcumyl cumyl peroxide (sold for example by Arkema under the trade name Luperox® DC60) is also interesting.

Some monoperoxycarbonates such as OO-tert-butyl-O-(2-ethylhexyl) monoperoxycarbonate, OO-tert-butyl-O-isopropyl monoperoxycarbonate and OO-tert-amyl-O-2-ethyl hexyl monoperoxycarbonate, can also be used.

Among the diacyl peroxides, the preferred peroxide is benzoyl peroxide.

Among the peroxyketals, the preferred peroxides are selected from the group consisting of 1,1-di-(t-butylperoxy)-3,3,5-trimethylcyclohexane, n-butyl 4,4-di-(t-butylperoxy) valerate, ethyl 3,3-di-(t-butylperoxy) butyrate, 2,2-di-(t-amylperoxy)-propane, 3,6,9-triethyl-3,6,9-trimethyl-1,4,7-triperoxynonane (or trimer cyclic methyl ethyl ketone peroxide), 3,3,5,7,7-pentamethyl-1,2,4-trioxepane, n-butyl 4,4-bis (t-amylperoxy) valerate, ethyl 3,3-di(t-amylperoxy) butyrate, 1,1-di(t-butylperoxy)cyclohexane, 1,1-di(t-amylperoxy)cyclohexane and mixtures thereof. Preferably, peroxyesters are selected from the group consisting of tert-butylperoxybenzoate, tert-butylperoxy-2-ethylhexanoate and tert-butylperoxy-3,5,5-trimethylhexanoate.

In a particularly preferred manner, the organic peroxide is selected from the group consisting of dicumyl peroxide, aryl or diaryl peroxides, diacetyl peroxide, benzoyl peroxide, dibenzoyl peroxide, ditertbutyl peroxide, tert-butylcumyl peroxide, 2,5-bis(tert-butylperoxy)-2,5-dimethylhexane, n-butyl-4,4'-di(tert-butylperoxy) valerate, OO-(t-butyl)-O-(2-ethylhexyl) monoperoxycarbonate, tert-butyl peroxyisopropylcarbonate, tert-butyl peroxybenzoate, tert-butyl peroxy-3,5,5-trim ethylhexanoate, 1,3(4)-bis(tert-butylperoxyisopropyl)benzene and mixtures thereof, more preferably in the group consisting of dicumyl peroxide, n-butyl-4,4'-di(tert-butylperoxy)-valerate, OO-(t-butyl) O-(2-ethylhexyl)monoperoxycarbonate, tert-butyl peroxyisopropylcarbonate, tert-butyl peroxybenzoate, tert-butyl peroxy-3,5,5-trimethylhexanoate, 1,3(4)-bis(tert-butylperoxyisopropyl)benzene and mixtures thereof.

Preferably, the mass quantity of organic peroxide in the composition is less than or equal to 10 phr. More preferably, the amount of organic peroxide in the composition is comprised within a range from 0.1 to 10 phr, even more preferably from 0.4 to 6 phr. Even more preferably, the amount of organic peroxide is comprised in a range from 0.8 to 4 phr.

In an also preferred variant, the mass quantity of organic peroxide in the composition may be less than or equal to 3 phr, preferably from 0.1 to 3 phr, in a more particularly preferred manner from 0.2 to 2 phr, and even more preferably from 0.25 to 1 phr.

Crosslinking Co-Agent of Organic Peroxide

The composition from which the crosslinking process is carried out preferably contains a crosslinking co-agent.

The co-agents can be classified according to their mode of action, of type 1 or 2, or also according to their chemical nature, and comprise in particular the (meth)acrylate compounds, in the form of salts such as zinc (Zn) (such as the compounds of formula I or II below) magnesium (Mg) or calcium (Ca) diacrylates or dimethacrylates; in the form of an ester such as polyfunctional acrylates or methacrylates; in polymeric form such as polybutadiene diacrylate; maleimide compounds such as bismaleimides or biscitraconimides; allylic compounds such as allylcyanurate and triallyl isocyanurate, or else vinyl compounds such as low molecular mass polymers with high vinyl proportion.

A single co-agent or a mixture of several co-agents can be used. When a mixture of several co-agents is used, they may be of the same or different type and of the same or different chemical nature.

The table below gives examples of these co-agents.

| Crosslinking co-agents | Acronym | Type 1 or 2 |
| --- | --- | --- |
| Trimethylolpropane triacrylate | TMPTA | Type 1 |
| Trimethylolpropane trimethacrylate | TMPTMA | Type 1 |
| Ethylene glycol dimethacrylate | EGDA | Type 1 |
| Ethylene glycol diacrylate | EGDMA | Type 1 |
| N,N'-m-phenylene dimaleimide | PDM | Type 1 |
| Zinc diacrylate | ZDA | Type 1 |
| Zinc dimethacrylate | ZDMA | Type 1 |
| Triallylcyanurate | TAC | Type 2 |
| Triallylisocyanurate | TAIC | Type 2 |
| 90% vinyl polybutadiene | HVPBd | Type 2 |
| 70% vinyl styrene-butadiene copolymer | HVSBR | Type 2 |

Preferably for the invention, the co-agent will comprise at least one compound selected from the group consisting of (meth)acrylate compounds, maleimide compounds, allylic compounds, vinyl compounds and mixtures thereof.

Preferably, the co-agent comprises a (meth)acrylate compound, in the form of a metal salt, or an ester or in a polymeric form.

Preferably for the invention, the co-agent comprises a (meth)acrylate compound in the form of a monovalent or bivalent metal salt an unsaturated alpha or beta carboxylic acid, preferably having 2 to 8 carbon atoms. In a particularly preferred manner, the metal compound of the metal salt is selected from the group consisting of zinc, aluminium, magnesium and calcium, preferably zinc.

The metal compound can be in the form of oxide, hydroxide or peroxide.

Even more preferably, the metal salt is a zinc salt of formula (I):

(I)

wherein $R_1$, $R_2$, $R_3$, $R_4$, $R_5$ and $R_6$ independently represent a hydrogen atom or a C1-C7 hydrocarbon group selected from linear, branched or cyclic alkyl groups, aralkyl groups, alkylaryl groups and aryl groups, and optionally interrupted by one or more heteroatoms, $R_2$ and $R_3$ on the one hand and $R_5$ and $R_6$ on the other hand being able to independently form a non-aromatic ring.

Cyclic alkyl group means an alkyl group comprising one or more rings.

Hydrocarbon group interrupted by one or more heteroatoms means a group comprising one or more heteroatoms, each heteroatom being comprised between two carbon atoms of said group, or between a carbon atom of said group and another heteroatom of said group or between two other heteroatoms of said group. The heteroatom(s) may be a nitrogen, sulphur or oxygen atom.

The addition of a metal co-agent containing several unsaturations and wherein the zinc is bonded to the rest of the molecule by ionic and non-covalent bonds (metal salt) allows to increase the efficiency of the peroxide during the crosslinking process and to confer certain particular properties to the crosslinked compositions.

According to a particular embodiment, $R_1$, $R_2$, $R_3$, $R_4$, $R_5$ and $R_6$ independently represent a hydrogen atom or a methyl group.

According to one embodiment, the metal salt is a compound of formula (II):

(II)

wherein $R_1$, $R_2$ and $R_3$ independently represent a hydrogen atom or a C1-C7 hydrocarbon group selected from linear, branched or cyclic alkyl groups, aralkyl groups, alkylaryl groups and aryl groups, and optionally interrupted by one or more heteroatoms, $R_2$ and $R_3$ being able to form a non-aromatic ring.

According to a particular embodiment, $R_1$, $R_2$ and $R_3$ independently represent a hydrogen atom or a methyl group.

Advantageously, $R_2$ and $R_3$ represent a hydrogen atom.

According to a particular embodiment, $R_1$ is a methyl group.

Preferably, the metal salt is zinc diacrylate or zinc dimethacrylate.

By way of example, mention may be made of zinc diacrylate (ZDA) DIMALINK® 633 from the company CRAY VALLEY or zinc dimethacrylate (ZDMA) DIMALINK® 634 from the company CRAY VALLEY.

Alternatively, the crosslinking co-agent may comprise a vinyl compound, for example selected from the group consisting of trans-stilbene, divinylbenzene, trans,trans-2,6-dimethyl-2,4,6-octatriene, dicyclopentadiene, 3,7-dimethyl-1,3,6-octatriene (OCIMENE), the compounds represented by the general formula (III):

(III)

wherein RX represents a hydrogen atom or an alkyl group of 1 to 9 carbon atoms and n is an integer comprised between 1 and 3, and the compounds represented by the general formula (IV):

(IV)

wherein $R^y$ and $R^z$ may be the same or different and represent an alkyl group of 1 to 4 carbon atoms.

As compounds represented by the general formula (III), mention may be made of α-methyl styrene, ortho, meta, para diisopropenyl benzene, 1,2,4-triisopropenyl benzene, 1,3,5-triisopropenyl benzene, 3-isopropyl-ortho diisopropenyl benzene, 4-isopropyl-ortho diisopropenyl benzene, 4-isopropyl-m-diisopropenyl benzene, 5-isopropyl-m-diisopropenyl benzene, 2-isopropyl-p-diisopropenyl benzene.

As compounds represented by the general formula (IV), mention may be made of 2,4-di (3-isopropylphenyl)-4-methyl-1-pentene, 2,4-di (4-isopropylphenyl) 4-methyl-1-pentene, 2-(3-isopropylphenyl)-4-(4-isopropylphenyl)-4-methyl-1-pentene, 2-(4-isopropylphenyl)-4-(3-isopropylphenyl)-4-methyl-1-pentene, 2,4-di(3-methylphenyl)-4-methyl-1-pentene, 2,4-di(4-methylphenyl)-4-methyl-1-pentene.

Methyl methacrylate, lauryl methacrylate, allyl methacrylate, trimethylolpropane triacrylate, triallyl cyanurate (TAC), triallyl isocyanurate (TAIC), triallyl phosphate, tetraallyloxyethane, allyl diglycol carbonate, triallyl trimellate, triallyl citrate, diallyl adipate, diallyl terephalate, diallyl oxalate, diallyl fumarate, ethylene glycol dimethacrylate and 2-hydroxyethyl methacrylate, may also be suitable as a crosslinking co-agent.

The maleimide compounds such as those represented by the general formula (X) can also be suitable as crosslinking co-agent:

wherein n is equal to 1 or 2 and R is divalent or trivalent and is selected from the group formed by acyclic aliphatic groups having from 2 to 16 carbon atoms, cyclic aliphatic groups having from 5 to 20 carbon atoms, aromatic groups having from 6 to 18 carbon atoms and alkyl aromatic (alkylaryl) groups having from 7 to 24 carbon atoms, and these divalent or trivalent groups may contain one or more oxygen, nitrogen and/or sulphur heteroatoms instead of one or more carbon atoms and each R4 is identical and represents a hydrogen atom or an alkyl group having from 1 to 18 carbon atoms.

Among the compounds of general formula (X), the bismaleimides and the biscitraconimides are advantageously selected.

As bismaleimide, mention may be made of N,N'-m-phenylene bismaleimide, N,N'-ethylene bismaleimide, N,N'-hexamethylene bismaleimide, N,N'-dodecamethylene bismaleimide, N,N'-(2,2,4-trimethylhexamethylene) bismaleimide, N,N'-(oxydipropylene) bismaleimide, N,N'-(aminodipropylene) bismaleimide, N,N'-(ethylenedioxydipropylene) bismaleimide, N,N'(1,4-cyclohexylene) bismaleimide, N,N'-(1,3-cyclohexylene) bismaleimide, N,N'-(methylene 1,4-dicyclohexylene)bismaleimide, N,N'-(isopropylidene-1,4-dicyclohexylene)bismaleimide, N,N'-(oxy-1,4-dicyclohexylene)bismaleimide, N,N'-p-(phenylene) bismaleimide, N,N'-(o-phenylene) bismaleimide, N,N'-(1,3-naphthylene) bismaleimide, N,N'-(1,4-naphthylene) bismaleimide, N,N'-(1,5-naphthylene) bismaleimide, N,N'-(3,3'dimethyl-(4,4-diphenylene) bismaleimide, N,N'-(3,3-dichloro-4,4 biphenylene) bismaleimide, N,N'-(2,4-pyridyl) bismaleimide, N,N'-(2,6-pyridyl) bismaleimide, N,N'-(1,4 anthraquinonediyl)bismaleimide, N,N'-(m-tolylene)bismaleimide, N,N'(p-tolylene) bismaleimide, N,N'-(4,6-dimethyl-1,3-phenylene) bismaleimide, N,N'-(2,3-dimethyl-1,4-phenylene) bismaleimide, N,N'-(4,6-dichloro-1,3-phenylene) bismaleimide, N,N'-(5-chloro-1,3-phenylene) bismaleimide, N,N'-(5-hydroxy-1,3-phenylene) bismaleimide, N,N'-(5-methoxy-1,3-phenylene) bismaleimide, N,N'-(m-xylylene) bismaleimide, N,N'-(p-xylylene)bismaleimide, N,N'-(methylenedi-p-phenylene) bismaleimide, N,N'-(isopropylidenedi-p-phenylene) bismaleimide, N,N'-(oxydi-p-phenylene) bismaleimide, N,N'-(thiodi-p-phenylene) bismaleimide, N,N'-(dithiodi-p-phenylene) bismaleimide, N,N'-(sulfodi-p-phenylene) bismaleimide, N,N'-(carbonyldi-p-phenylene) bismaleimide, α,α'-bis-(4-maleimodophenyl)-meta-diisopropylbenzene, α,α'-bis-(4-p-phenylene) bismaleimide and α,α'-bis-(4-maleimidophenyl)-para-diisopropylbenzene.

As biscitraconimides, mention may be made of 1,2-N,N'-dimethylene biscitraconimide, 1,2-N,N'-trimethylene biscitraconimide, 1,5-N,N'-(2-methyl-pentamethylene) biscitraconimide and the N,N'-methylphenylene)biscitraconimide.

The mass quantity of co-agent is preferably comprised within a range from 5 to 50 phr. Ranges from 10 to 50 phr, from 10 to 30 phr, and from 20 to 30 phr are preferred. Such amounts allow good dispersion of the co-agent in the composition; in addition, the properties of the crosslinked composition obtained are less degradable and the effect of the co-agent is notable on the stiffening and strengthening of the crosslinked composition.

Advantageously, the ratio of the mass quantity of organic peroxide to the mass quantity of co-agent is less than 0.5, preferably less than 0.2. Such a low ratio is favourable in terms of synergy between the organic peroxide and the co-agent, which has a positive effect on the rheometry and the breaking elongation of the composition.

In some preferred embodiments, the ratio of the mass quantity of peroxide to the mass quantity of co-agent is less than or equal to 0.09, or 0.05, more preferably less than or equal to 0.04 and more preferably less than or equal to 0.03.

Magnesium Oxide

According to one embodiment, the magnesium oxide is used in a mass quantity comprised from 1 phr to 50 phr, preferably from 2 phr to 30 phr, more preferably from 5 to 15 phr.

When a crosslinking co-agent is present, the ratio of the mass quantity of co-agent to the mass quantity of magnesium oxide in the composition is preferably from 0.5 to 5, more preferably from 0.8 to 2, and even more particularly preferably from 1 to 1.5.

According to embodiments, the ratio of the mass quantity of magnesium oxide to the mass quantity of organic peroxide in the composition is greater than or equal to 1. Preferably, this ratio is from 5 to 60, more preferably from 10 to 40, and even more particularly preferably from 15 to 30.

Advantageously, magnesium oxide has a BET specific surface area ranging from 1 to 200 $m^2/g$. More preferably, magnesium oxide has a BET specific surface area ranging from 5 to 170 $m^2/g$. The BET specific surface area of magnesium oxide is measured according to the standard ISO 9277:2010.

Particularly advantageously, magnesium oxide has a BET specific surface area greater than 25 $m^2/g$.

According to particular embodiments, the magnesium oxide has a BET specific surface area ranging from 1 to 60 $m^2/g$, from 60 to 120 $m^2/g$ or from 120 to 200 $m^2/g$; or from 1 to 20 $m^2/g$, from 20 to 25 $m^2/g$, from 20 to 26 $m^2/g$, from 25 to 30 $m^2/g$, from 26 to 30 $m^2/g$, from 30 to 40 $m^2/g$, from 40 to 60 $m^2/g$, from 40 to 90 $m^2/g$, from 60 to 90 $m^2/g$, from 90 to 120 $m^2/g$, from 90 to 140 $m^2/g$, from 90 to 170 $m^2/g$, from 120 to 170 $m^2/g$, from 140 to 170 $m^2/g$, or from 170 to 200 $m^2/g$.

According to the invention, the presence of magnesium oxide in the composition has the effect of increasing the crosslinking density and/or the crosslinking rate of the crosslinkable polymer.

The crosslinking density is related to the number of bridge bonds per constituent unit of the polymer. It can be determined by a rheometric measurement, for example using a rheometer. For example, it can be determined according to the standard ASTM D5289A using an RPA 2000 or MDR type rheometer, at a temperature of 160° C., with an oscillation amplitude of 0.5°, an oscillation frequency of 1.667 Hz, from discs of the sample to be tested 3.5 cm in diameter and 4.8 $cm^3$ in volume.

Depending on the crosslinking systems, adjusting the temperature to a different value may be appropriate.

The measurement is carried out during the crosslinking of the sample to be tested which is initiated at the same time as the measurement, by placing the sample in a preheated test cavity. It allows to obtain a rheometric curve representing the evolution of the viscoelastic torque resulting from the deformation imposed on the composition to be tested as a function of time. In the context of the present application, the crosslinking density is defined directly by the difference between the maximum torque MH and the minimum torque ML, and is expressed in dN m.

The minimum torque ML corresponds to the minimum value of the torque measured during crosslinking (at the start of the test).

The maximum torque MH corresponds to the value of the torque at the end of the measurement. Preferably, the duration of the test is adjusted so that the crosslinking is essentially completed at the end of this duration, the torque then reaching a plateau. An appropriate duration for the test is for example of 60 minutes. However, this duration can be adapted depending on the actual duration planned for the manufacture of a given part, from the crosslinkable polymer composition, and at a given temperature.

The crosslinking rate is evaluated by the value T'90 corresponding to the time necessary to reach 90% of the maximum torque, which is obtained using the rheometric measurement described above. The lower T'90, the higher the crosslinking rate.

According to a particular embodiment, the crosslinking density obtained is greater than the crosslinking density which is obtained under the same conditions but without the use of magnesium oxide. Preferably, the crosslinking density obtained is greater than 1.5 times, 2 times, 3 times, 5 times, 10 times, 20 times, 50 times or 100 times the crosslinking density which is obtained under the same conditions but without the use of magnesium oxide.

"Same conditions but without the use of magnesium oxide", means a crosslinking carried out with the same parameters (the same duration, the same temperature, etc.) and from the same composition, with the exception of the presence of magnesium oxide, as for the crosslinking according to the invention carried out in the presence of magnesium oxide.

In this embodiment, the crosslinking densities obtained with and without magnesium oxide can be measured in the same way, according to the procedure described above.

According to a particular embodiment, the crosslinking rate obtained is greater than the crosslinking rate which is obtained under the same conditions but without the use of magnesium oxide. Preferably, the crosslinking rate during the crosslinking process is greater than 1.1 times, 1.2 times, 1.3 times, 1.4 times, 1.5 times, 1.8 times or 2 times the crosslinking rate which is obtained under the same conditions but without the use of magnesium oxide.

The crosslinking rates obtained with and without magnesium oxide can be measured in the same way, according to the procedure described above.

Other Additives in the Composition

The composition from which the crosslinking process is implemented can also comprise a reinforcing filler.

The physical state under which the reinforcing filler is present is immaterial, whether in the form of powder, microbeads, granules, beads or any other suitable densified form.

One can use for example an organic filler such as carbon black, an inorganic reinforcing filler such as silica, or a blend of these two types of filler, in particular a blend of carbon black and silica.

As other reinforcing fillers, it is also possible to use cellulosic fillers, talc, calcium carbonate, mica or wollastonite, glass or metal oxides or hydrates, with the exception of magnesium oxide.

As carbon blacks, all carbon blacks are suitable, in particular blacks called pneumatic grade blacks. Among the latter, mention may be made more particularly of the reinforcing carbon blacks of the 100, 200 or 300 series (ASTM grades), such as, for example, the blacks N115, N134, N234, N326, N330, N339, N347, N375, or else, according to the intended applications, the blacks of higher series (for example N660, N683, N772). The carbon blacks could, for example, already be incorporated into an isoprene elastomer in the form of a masterbatch (see, for example, documents WO 97/36724 or WO 99/16600).

As examples of organic fillers other than carbon blacks, mention may be made of organic fillers of functionalised polyvinyl as described in documents WO 2006/069792, WO 2006/069793, WO 2008/003434 and WO 2008/003435.

The composition may also contain a type of silica or a blend of several silicas. The silica used can be any reinforcing silica known to the person skilled in the art, in particular any precipitated or pyrogenic silica having a BET surface area as well as a CTAB specific surface area, both less than 450 m$^2$/g, preferably from 5 to 400 m$^2$/g. The BET specific surface area is determined according to the standard ISO 9277:2010 and the CTAB specific surface area is measured according to the standard ISO 6810:1995. As highly dispersible precipitated silicas (known as HDS), mention may, for example, be made of Ultrasil 7000 and Ultrasil 7005 silicas from the company Degussa, Zeosil 1165MP, 1135MP and 1115MP silicas from the company Rhodia, Hi-Sil EZ150G silica from the company PPG, the Zeopol 8715, 8745 and 8755 silicas from the company Huber, treated precipitated silicas such as for example the aluminium doped silicas described in application EP 0735088 or the silicas with high specific surface area as described in the application WO 03/16837.

The silica preferably has a BET surface area comprised between 45 and 400 m$^2$/g, more preferably comprised between 60 and 300 m$^2$/g.

It is also possible to use a reinforcing filler of another nature, in particular organic reinforcing filler, covered with a layer of silica, or else which would include on its surface functional sites, in particular hydroxyls.

The volume fraction of the reinforcing filler in the composition is defined as the ratio of the volume of the reinforcing filler to the volume of all the constituents of the composition, it being understood that the volume of all the constituents is calculated by adding the volume of each of the constituents of the composition. The volume fraction of the reinforcing filler in a composition is therefore defined as the ratio of the volume of the reinforcing filler to the sum of the volumes of each of the constituents of the composition, and preferably, this volume fraction is comprised between 5% and 20%, preferably between 5% and 15%. In an equivalent preferential manner, the mass quantity of the total reinforcing filler (for example carbon black and/or silica) is less than 50 phr, preferably from 5 to 45 phr, more preferably from 10 to 40 phr and most preferably, from 15 to 35 phr.

Preferably, the ratio of the mass quantity of filler to the mass quantity of co-agent is less than or equal to 2. More preferably, this ratio is comprised within a range from 0.3 to 2, preferably from 0.7 at 1.3. Preferably, the composition according to the invention comprises predominantly carbon black as a reinforcing filler.

Majority reinforcing filler means that which has the highest proportion among the reinforcing fillers present in the composition. In particular, majority reinforcing filler means any reinforcing filler which represents at least 50% by weight of the reinforcing fillers present, preferably more than 50% and more preferably more than 60%.

The composition may optionally also contain, in addition to reinforcing fillers, coupling agents, coupling activators, agents for recovering inorganic fillers or, more generally, processing aid agents which are capable in a known manner, thanks to an improvement of the dispersion of the filler in the matrix of crosslinkable polymers and a lowering of the viscosity of the composition, of improving the ability to be used in the raw state, these agents being, for example, hydrolysable silanes such as alkylalkoxysilanes, polyols, fatty acids, polyethers, primary, secondary or tertiary amines, hydroxylated or hydrolysable polyorganosiloxanes.

As coupling agent, it is possible in particular to use polysulphurised silanes, said to be symmetrical or asymmetrical according to their particular structure, known to the person skilled in the art, such as those described for example in documents WO 03/002648 and WO 03/002649.

In the composition according to the invention, the content of coupling agent is preferably comprised between 2 and 15 phr, more preferably between 3 and 13 phr and even more preferably between 5 and 10 phr.

The composition can also comprise a processing agent, particularly zinc oxide or calcium oxide, preferably zinc oxide.

Preferably, the composition from which the crosslinking process is implemented does not contain a vulcanisation system, which is one of the advantages of the invention since this allows to simplify the formula and the preparation of the composition. If, however, a vulcanisation system is present in the composition, it is preferably present in small amounts explained below.

The actual vulcanisation system is usually based on sulphur (or a sulphur donor) and on a primary vulcanisation accelerator. To this basic vulcanisation system are added, incorporated during the first non-productive phase and/or during the productive phase as described below, various secondary accelerators or known vulcanisation activators such as zinc oxide, stearic acid or equivalent compounds, guanidine derivatives (particularly diphenylguanidine).

Molecular sulphur (or in an equivalent manner molecular sulphur donor agents), when used, is at a proportion preferably less than 0.5 phr, preferably less than 0.3 phr, more preferably at a proportion less than 0.1 phr. Very preferably, the composition is free of molecular sulphur.

The vulcanisation system can also comprise one or more additional accelerators, for example the compounds of the thiuram family, zinc dithiocarbamate derivatives, sulfenamides, guanidines or thiophosphates. It is possible in particular to use any compound capable of acting as a vulcanisation accelerator of polymers in the presence of sulphur, in particular accelerators of the thiazole type as well as their derivatives, accelerators of the thiuram type, zinc dithiocarbamates. These accelerators are more preferably selected from the group consisting of 2-mercaptobenzothiazyl disulphide (abbreviated MBTS), N-cyclohexyl-2-benzothiazyle sulfenamide (abbreviated CBS), N,N-dicyclohexyl-2-benzothiazyle sulfenamide (abbreviated DCBS), N-tert-butyl-2-benzothiazyl sulfenamide (abbreviated TBBS), N-tert-butyl-2-benzothiazyl sulfenimide (abbreviated TBSI), zinc dibenzyldithiocarbamate (abbreviated ZBEC) and mixtures of these compounds. Preferably, a primary accelerator of the sulfenamide type is used.

Preferably, the composition is free of any vulcanisation accelerator (other than the co-agent and magnesium oxide).

The composition according to the invention may also include additives such as petroleum fractions, solvents, plasticising agents, whether the latter are of aromatic or non-aromatic nature, pigments and/or dyes, tackifying resins, processing aids, lubricants, anti-radiation (anti-UV) additives, protective agents such as anti-ozone waxes (such as Ozone Wax C32 ST), chemical anti-ozonants, antioxidants (such as 6-paraphenylenediamine), anti-fatigue agents, reinforcing resins, methylene acceptors (for example novolac phenolic resin) or methylene donors (for example HMT or H3M) as described for example in document WO 02/10269, as well as adhesion promoters (cobalt salts for example).

Particularly, the composition may comprise a plasticiser, an antioxidant, a stabiliser or a mixture thereof.

According to one embodiment, the composition is free of plasticising agent.

According to another embodiment, the composition according to the invention includes a plasticising agent. Preferably, this plasticising agent is a solid hydrocarbon resin (or plasticising resin), an extension oil (or plasticising oil), or a mixture of the two.

When it is included in the composition, the proportion of the total plasticising agent is preferably greater than or equal to 5 phr, more preferably from 5 to 100 phr, particularly from 10 to 80 phr, for example from 15 to 70 phr.

Use/Crosslinking Process

The use according to the invention provides for implementing the crosslinking of a composition as described above, in a crosslinking process. This process can be implemented as follows.

The composition can be manufactured in a suitable mixer, using two successive preparation phases well known to the person skilled in the art: a first working phase or thermomechanical kneading (sometimes referred to as the non-productive phase) at high temperature, up to a maximum temperature comprised between 110° C. and 190° C., preferably between 130° C. and 180° C., followed by a second mechanical working phase (sometimes referred to as the productive phase) at a lower temperature, typically below 110° C., for example between 60° C. and 100° C., finishing phase during which the crosslinking or vulcanisation system and in particular the peroxide is incorporated; such phases have been described for example in documents EP 0501227, EP 0735088, EP 0810258, WO 00/05300 or WO 00/05301.

The first (non-productive) phase is preferably carried out in several thermomechanical steps. During a first step, the polymers and the reinforcing fillers (and optionally the coupling agents and/or other ingredients) are introduced into a suitable mixer such as a usual internal mixer, at a temperature comprised between 20° C. nd 100° C., preferably between 25° C. and 100° C.

After a few minutes, preferably from 0.5 to 2 min and a rise in temperature from 90° C. to 100° C., the other ingredients (that is to say those that remain if not all of them have been put at the start) are added all at once or in portions, with the exception of the crosslinking system and in particular the organic peroxide during a mixing ranging from 20 seconds to a few minutes. The total duration of the kneading, in this non-productive phase, is preferably comprised between 2 and 10 minutes at a temperature less than or equal to 180° C., and preferably less than or equal to 170° C.

After the mixture thus obtained has cooled, the crosslinking system, and in particular the peroxide, is then incorporated at a low temperature (typically less than 100° C.), generally in an external mixer such as a cylinder mixer. The whole is then mixed (productive phase) for a few minutes, for example between 5 and 15 min.

The composition thus obtained is then calendered, for example in the shape of a sheet or a plate, in particular for a characterisation in the laboratory, or else extruded, to form for example a rubber profile used for the manufacture of semi-finished products in order to obtain finished products.

The crosslinking (or baking) is carried out in a known manner at a temperature generally comprised between 130° C. and 200° C., under pressure, for a sufficient time which can vary for example between 5 and 90 min depending in particular on the baking temperature, the crosslinking system adopted and the vulcanisation kinetics of the composition under consideration.

According to one embodiment, the crosslinking process is implemented for the manufacture of all or part of hoses, pipes, seals, O-rings, transmission belts, engine mounts, anti-vibration systems, window profiles, car body and window sealing profiles, insulators for electric cables, shoe soles, rubber mats, conveyor belts and/or golf balls.

The invention also relates to the products obtained at the end of the crosslinking process.

Masterbatch

The object of the invention is also a masterbatch composition comprising:
from 30 to 80% by mass of a crosslinking co-agent,
from 0.5 to 10% by mass of an organic peroxide,
from 15 to 60% by mass of magnesium oxide, and from 0 to 40% by mass of one or more crosslinkable polymers.

According to embodiments, the crosslinking co-agent is as described above.

Advantageously, the co-agent is a metal salt, preferably a zinc salt of formula (I):

wherein $R_1$, $R_2$, $R_3$, $R_4$, $R_5$ and $R_6$ independently represent a hydrogen atom or a C1-C7 hydrocarbon group selected from linear, branched or cyclic alkyl groups, aralkyl groups, alkylaryl groups and aryl groups, and optionally interrupted by one or more heteroatoms, $R_2$ and $R_3$ on the one hand and $R_5$ and $R_6$ on the other hand being able to independently form a non-aromatic ring.

Even more advantageously, the metal salt is a zinc salt of formula (II):

wherein $R_1$, $R_2$ and $R_3$ independently represent a hydrogen atom or a C1-C7 hydrocarbon group selected from linear, branched or cyclic alkyl groups, aralkyl groups, alkylaryl groups and aryl groups, and optionally interrupted by one or more heteroatoms, $R_2$ and $R_3$ can form a non-aromatic ring.

In particular embodiments, the co-agent is as defined in the preceding sections; and/or the organic peroxide is as defined in the preceding sections; and/or the magnesium oxide is as defined in the preceding sections; and/or the crosslinkable polymer is as defined in the preceding sections.

When one of the compounds, in particular the organic peroxide, is supplied as a mixture with a solvent or diluent, a certain amount of this solvent or diluent may also be present in the masterbatch.

This masterbatch can be used as such for the preparation of the crosslinkable composition, in particular by mixing it with an additional quantity of crosslinkable polymers (preferably the same as those of the masterbatch), and optionally with a reinforcing filler or other additives.

Advantageously, in the masterbatch, the ratio of the mass quantity of organic peroxide and the mass quantity of co-agent is less than 0.5, preferably less than 0.2. It can in particular be less than or equal to 0.09, or 0.05, more preferably still less than or equal to 0.04 and more preferably less than or equal to 0.03.

Advantageously, in the masterbatch, the ratio of the mass quantity of magnesium oxide to the mass quantity of organic peroxide is from 5 to 60, preferably from 10 to 40, and more particularly preferably from 15 to 30.

Advantageously, in the masterbatch, the ratio of the mass quantity of co-agent to the mass quantity of magnesium oxide in the composition is from 0.5 to 5, preferably from 0.8 to 2, and more particularly preferably from 1 to 1.5.

According to one embodiment, the masterbatch essentially consists of the co-agent, the organic peroxide and the magnesium oxide.

According to one embodiment, the masterbatch consists of the co-agent, the organic peroxide and the magnesium oxide.

According to one embodiment, the masterbatch essentially consists of the co-agent, the organic peroxide, the magnesium oxide and the crosslinkable polymer(s).

According to one embodiment, the masterbatch consists of the co-agent, the organic peroxide, the magnesium oxide and the crosslinkable polymer(s).

Alternatively, the masterbatch may comprise one or more additives as described above in connection with the crosslinkable composition.

According to one embodiment, the presence of a crosslinkable polymer in the masterbatch allows to formulate the masterbatch in the form of granules, the powder consisting of at least the co-agent, the magnesium oxide and the organic peroxide being partially or preferably completely coated by the crosslinkable polymer. This embodiment has advantages in terms of health and safety.

According to one embodiment, the masterbatch is used for the manufacture of all or part of an article such as a hose, a pipe, a seal, an O-ring, a transmission belt, an engine mount, an anti-vibration system, a window profile, a car body and window sealing profile, an insulator for electric cables, a shoe sole, a rubber mat, a conveyor belt and/or a golf ball.

The invention also relates to an article, such as a hose, a pipe, a seal, an O-ring, a transmission belt, an engine mount, an anti-vibration system, a window profile, a car body and window sealing profile, an insulator for electric cables, a shoe sole, a rubber mat, a conveyor belt and/or a golf ball, all or part of which is obtained by crosslinking a crosslinkable composition made from the masterbatch.

EXAMPLES

The following examples illustrate the invention without limiting it.

Example 1

The crosslinking density and the crosslinking rate of different compositions were evaluated. The following compositions were prepared:

| Composition no | 1 | 2 | 3 | 4 | 5 | 6 |
|---|---|---|---|---|---|---|
| BR (phr) | 100 | 100 | 100 | 100 | 100 | 100 |
| Carbon black N234 (phr) | 25 | 25 | 25 | 25 | 25 | 25 |
| Zinc dimethacrylate (phr) | 20 | 20 | 20 | 20 | 20 | 20 |
| Zinc oxide (phr) | 2 | 2 | 2 | 2 | 2 | 2 |
| Dicumyl peroxide (phr) | 0.9 | — | — | — | — | — |
| Luperox ® 230XL40-SP(phr) | — | 1.45 | — | — | — | — |
| Luperox ® TBEC (phr) | — | — | 0.89 | — | — | — |
| Luperox ® TBICM75 (phr) | — | — | — | 0.82 | — | — |
| Luperox ® 270 (phr) | — | — | — | — | 0.81 | — |
| Luperox ® P (phr) | — | — | — | — | — | 0.69 |

| Composition no | 1 | 2 | 3 | 4 | 5 | 6 |
|---|---|---|---|---|---|---|
| Magnesium oxide (phr) | 15 | 15 | 15 | 15 | 15 | 15 |

| Composition no | 7 | 8 | 9 | 10 | 11 | 12 | 13 | 14 |
|---|---|---|---|---|---|---|---|---|
| BR (phr) | 100 | 100 | 100 | 100 | 100 | 100 | 100 | 100 |
| Carbon black N234 (phr) | 25 | 25 | 25 | 25 | 25 | 25 | 25 | 25 |
| Zinc dimethacrylate (phr) | 20 | 20 | 20 | 20 | 20 | 20 | 20 | 20 |
| Zinc oxide (phr) | 2 | 2 | 2 | 2 | 2 | 2 | 2 | 2 |
| Dicumyl peroxide (phr) | 0.9 | — | — | — | — | — | 0.9 | — |
| Luperox ® 230XL40-SP(phr) | — | 1.45 | — | — | — | — | — | 1.45 |
| Luperox ® TBEC (phr) | — | — | 0.89 | — | — | — | — | — |
| Luperox ® TBICM75 (phr) | — | — | — | 0.82 | — | — | — | — |
| Luperox ® 270 (phr) | — | — | — | — | 0.81 | — | — | — |
| Luperox ® P (phr) | — | — | — | — | — | 0.69 | — | — |
| N,N-phenylene bismaleimide (phr) | — | — | — | — | — | — | 0.5 | 0.5 |
| Magnesium oxide (phr) | — | — | — | — | — | — | — | — |

BR = polybutadiene
Luperox ® 230XL40-SP = n-butyl-4,4'-di(tert-butylperoxy) valerate
Luperox ® TBEC = OO-(t-butyl)-O-(2-ethylhexyl) monoperoxycarbonate
Luperox ® TBICM75 = tert-butyl peroxyisopropylcarbonate
Luperox ® 270 = tert-butyl peroxy-3,5,5-trimethylhexanoate
Luperox ® P = tert-butyl peroxybenzoate The compositions were prepared using a Brabender 350S internal mixer (maximum capacity: 350 ml). The parameters are as follows:
Initial temperature: 22° C. (room temperature);
Rotor rotation speed: 50 rpm (revolutions per minute);
Order and time of introduction of raw materials:

| 0 | BR |
|---|---|
| 5 min | Carbon black N234 |
| 10 min | Zinc dimethacrylate |
| 12 min | Zinc oxide |
| 14 min | crosslinking system (peroxide optionally followed by MgO optionally followed by the crosslinking co-agent) |
| 16 min | Fall of the mixture |

Final temperature (fall of the mixture): maximum 80° C.
The mixtures were homogenised in an open Gumix brand mixer at room temperature to obtain plates approximately 5 mm thick, which were allowed to cool at room temperature and then tested the day after the day of production.

Compositions 1 to 6 illustrate the use according to the invention, compositions 7 to 14 correspond to comparative examples.

The crosslinking density and the crosslinking rate are evaluated as follows:

A disc about 3.5 cm in diameter is cut from the plate of the mixture to be tested. It is placed between two sheets of Mylar-type polymer then the whole is placed in the test cavity of the RPA 2000 rheometer already preheated to the test temperature and adjusted according to the following parameters:

Temperature: 160° C.;
Oscillation amplitude: 0.5°;
Oscillation frequency: 1.667 Hz;
Time: 60 min.

The test is started immediately and the measurements are automatically recorded by the computer connected to the instrument.

Figure 1:
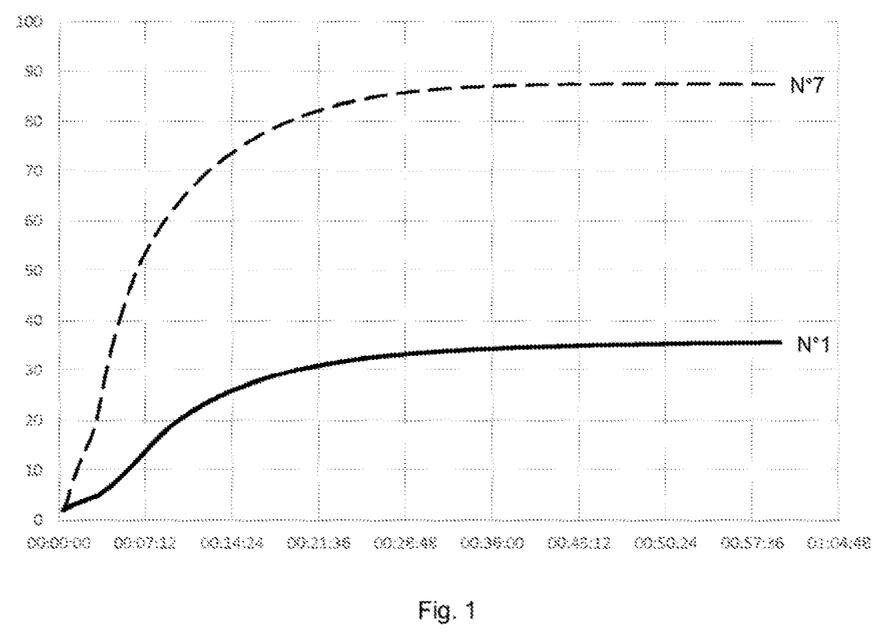
FIG. 1 shows the rheometric curves obtained by an RPA 2000 rheometer, at 160° C., during the crosslinking of composition no. 1 and of composition no. 7 described in example 1. The time (in h:min:s) is on the abscissa and the torque S', in dN m, is on the ordinate.
Figure 2:
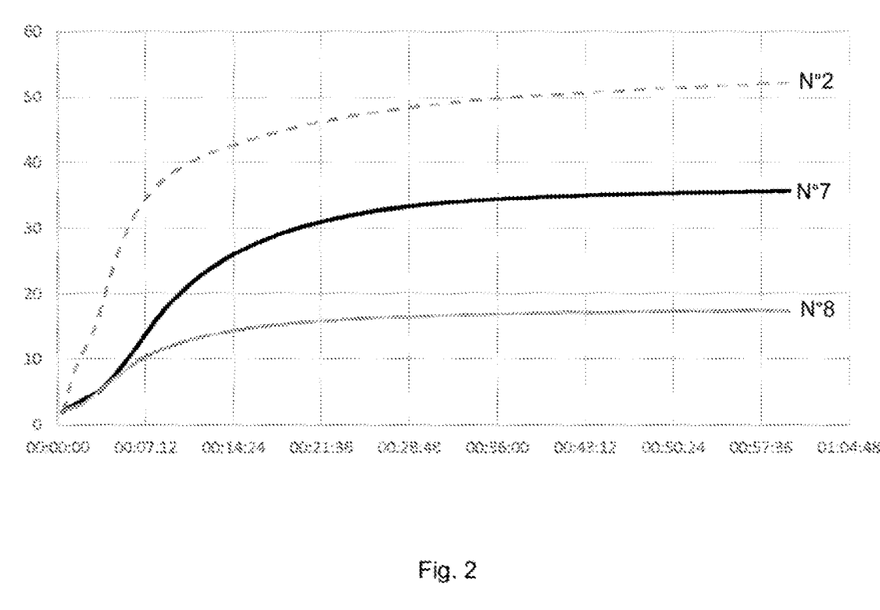
FIG. 2 shows the rheometric curves obtained by an RPA 2000 rheometer, at 160° C., during the crosslinking of compositions no. 7, no. 8 and no. 2 described in example 1. The time (in h:min:s) is on the abscissa and the torque S', in dN m, is on the ordinate.
Figure 3:
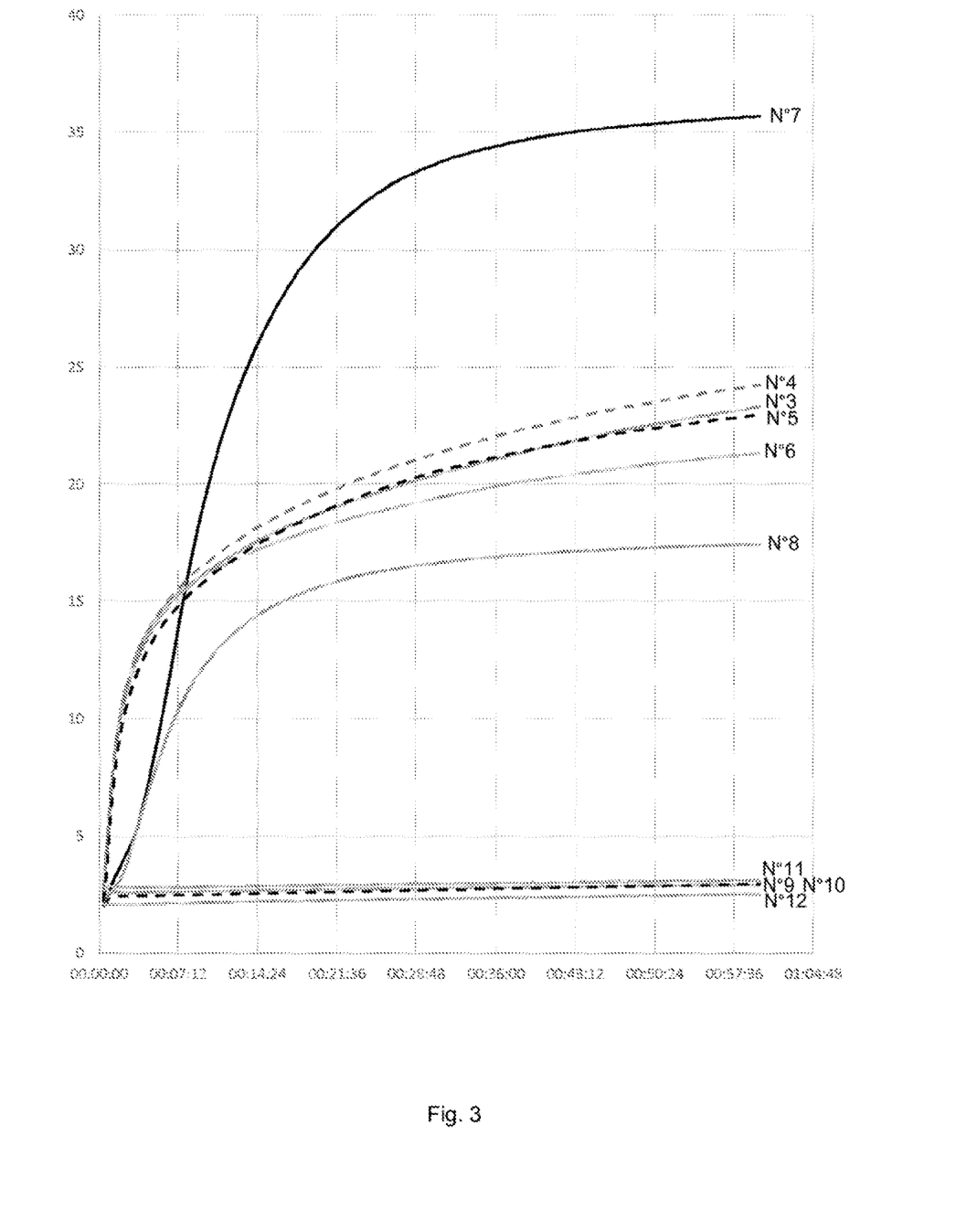
FIG. 3 shows the rheometric curves obtained by an RPA 2000 rheometer, at 160° C., during the crosslinking of compositions no. 3, no. 4, no. 5, no. 6, no. 7, no. 8, no. 9, no. 10, no. 11, and no. 12 described in example 1. The time (in h:min:s) is on the abscissa and the torque S', in dN m, is on the ordinate.

The results are summarised in FIGS. 1, 2, 3 and 6, as well as in the tables below:

| Composition no | 1 | 2 | 3 | 4 | 5 | 6 |
|---|---|---|---|---|---|---|
| ML (dN m) | 1.956 | 2.04 | 2.544 | 2.512 | 2.236 | 2.384 |
| MH (dN m) | 87.69 | 52.25 | 23.3 | 24.24 | 22.98 | 21.33 |
| T'90 (h:min:s) | 00:18:12 | 00:24:11 | 00:37:14 | 00:36:03 | 00:33:32 | 00:30:47 |
| Ts2 (h:min:s) | 00:00:39 | 00:00:42 | 00:00:43 | 00:00:42 | 00:0046 | 00:00:45 |
| MH − ML (dNm) | 85.7 | 50.2 | 20.8 | 21.7 | 20.7 | 18.9 |

| Composition no | 7 | 8 | 9 | 10 | 11 | 12 | 13 | 14 |
|---|---|---|---|---|---|---|---|---|
| ML (dN m) | 2.003 | 1.988 | — | — | — | — | 1.95 | 1.961 |
| MH (dN m) | 35.7 | 17.45 | — | — | — | — | 41.28 | 19.8 |
| T'90 (h:min:s) | 00:25:02 | 00:22:12 | — | — | — | — | 00:27:09 | 00:21:16 |
| Ts2 (h:min:s) | 00:02:15 | 00:02:38 | — | — | — | — | 00:02:02 | 00:02:03 |
| MH − ML (dN m) | 33.7 | 15.5 | — | — | — | — | 39.3 | 17.8 |

The value Ts2 corresponds to the scorching time, that is to say the time necessary to achieve a viscosity increase of 2 units from the minimum torque ML.

It is found that the compositions containing magnesium oxide (compositions no. 1 and 2) have a higher crosslinking density than the same compositions without magnesium oxide (compositions no. 7 and 8) or that the same compositions containing N, N-phenylene bismaleimide as crosslinking co-agent (compositions no. 13 and 14). N,N-phenylene bismaleimide is a crosslinking co-agent conventionally used and well known to the person skilled in the art.

T'90 obtained with composition no. 1 is lower than that observed with compositions no. 7 and no. 13 (same composition without magnesium oxide or with N,N-phenylene bismaleimide as crosslinking agent). On the other hand, T'90 obtained with composition no. 2 is higher than that observed with compositions no. 8 and no. 14.

The scorching time Ts2 of composition no. 1 and that of composition no. 2 are shorter than that of compositions no. 7 and no. 13 and that of compositions no. 8 and no. 14 respectively.

It can also be noted that compositions no. 9, 10, 11 and 12 do not crosslink and that the addition of magnesium oxide in these compositions allows crosslinking of these compositions (compositions no. 3, 4, 5 and 6).

Example 2

In this example, compositions having a lower amount of carbon black were tested.

The following compositions were prepared:

| Composition no | 15 | 16 | 17 | 18 | 19 |
|---|---|---|---|---|---|
| BR (phr) | 100 | 100 | 100 | 100 | 100 |
| Carbon black N234 (phr) | 3 | 3 | 3 | 3 | 3 |
| Zinc dimethacrylate (phr) | 20 | 20 | 20 | 20 | 20 |
| Zinc oxide (phr) | 2 | 2 | 2 | 2 | 2 |
| Dicumyl peroxide (phr) | 0.9 | — | 0.4 | 0.8 | — |
| TBEC (phr) | — | 0.89 | — | — | 0.89 |
| Magnesium oxide (phr) | 15 | 15 | — | — | — |

The compositions were prepared in the same manner as in Example 1.

Compositions 15 and 16 illustrate the use of magnesium oxide according to the invention, compositions 17 to 19 correspond to comparative examples.

The crosslinking density and the crosslinking rate are evaluated in the same way as in Example 1.

Figure 4:
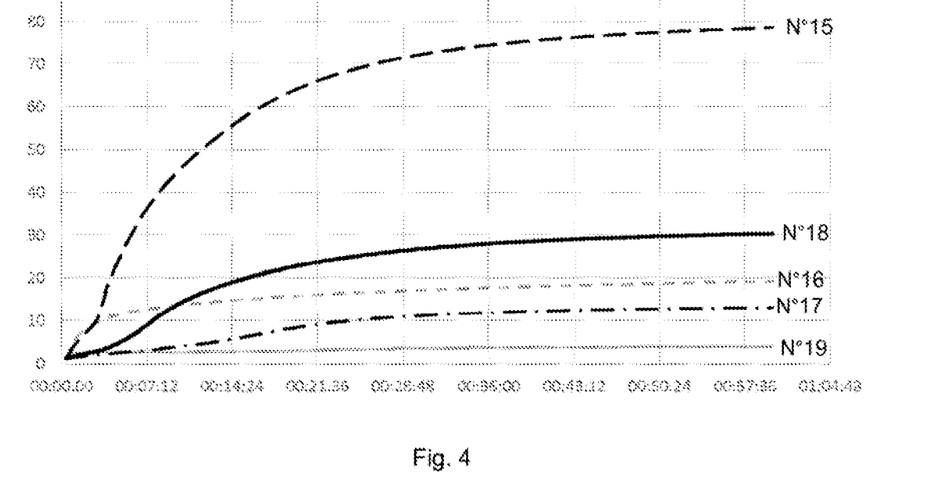
FIG. 4 shows the rheometric curves obtained by an RPA 2000 rheometer, at 160° C., during the crosslinking of compositions no. 15, no. 16, no. 17, no. 18 and no. 19 described in example 2. The time (in h:min:s) is on the abscissa and the torque S', in dN m, is on the ordinate.

The results are summarised in FIG. 4, as well as in the table below:

| Composition no | 15 | 16 | 17 | 18 | 19 |
|---|---|---|---|---|---|
| ML (dN m) | 1.35 | 1.59 | 1.252 | 1.218 | 1.318 |

| Composition no | 15 | 16 | 17 | 18 | 19 |
|---|---|---|---|---|---|
| MH (dN m) | 78.69 | 19.34 | 13.12 | 30.43 | 3.98 |
| T'90 (h:min:s) | 00:27:44 | 00:33:47 | 00:35:53 | 00:33:20 | 00:36:02 |
| Ts2 (h:min:s) | 00:00:49 | 00:00:46 | 00:07:44 | 00:03:29 | 00:25:07 |
| MH − ML (dN m) | 77.3 | 17.8 | 11.9 | 29.2 | 2.7 |

The crosslinking rate and the crosslinking density are increased by the addition of magnesium oxide even when the amount of carbon black is low.

Example 3

In this example, the effect of using magnesium oxide was tested with a different elastomer.

The following compositions were prepared:

| Composition no | 20 | 21 | 22 | 23 | 24 | 25 |
|---|---|---|---|---|---|---|
| EPDM Vistalon 2504N (phr) | 100 | 100 | 100 | 100 | 100 | 100 |
| Carbon black N550 (phr) | 100 | 100 | 100 | 100 | 100 | 100 |
| Paraffin Oil Primol 352 | 40 | 40 | 40 | 40 | 40 | 40 |
| PEG | 3 | 3 | 3 | 3 | 3 | 3 |
| TMQ | 1 | 1 | 1 | 1 | 1 | 1 |
| Luperox ® F40 | 8 | 8 | 8 | 8 | 8 | 8 |
| Zinc dimethacrylate (phr) | 2 | 20 | — | 2 | 20 | — |
| Magnesium oxide (phr) | 5 | 5 | 10 | — | — | — |

PEG: polyethylene glycol (MW approx. 4000)
TMQ: polymerised trimethyl quinoline
Luperox ® F40 = 1,3(4)-bis(tert-butylperoxyisopropyl)benzene diluted to 40% on calcium carbonate The compositions were prepared using a Brabender 350S internal mixer (maximum capacity: 350 ml). The parameters are as follows:

Initial temperature: 22° C. (room temperature);
Rotor rotation speed: 50 rpm (revolutions per minute);

Order and time of introduction of raw materials:

| | |
|---|---|
| 0 | EPDM Vistalon 2504N |
| 5 min | 1/2 Carbon black N550 followed by 1/2 paraffin oil Primol 352 |
| 10 min | 2/2 Carbon black N550 followed by 2/2 paraffin oil Primol 352 |
| 15 min | PEG followed by TMQ |
| 20 min | According to the test: Zinc dimethacrylate |
| 22 min | crosslinking system (peroxide optionally followed by MgO) |
| 24 min | Fall of the mixture |

Final temperature (fall of the mixture): maximum 100° C.

Compositions 20 and 21 illustrate the use according to the invention, compositions 22 to 25 correspond to comparative examples.

The crosslinking density and the crosslinking rate are evaluated in the same manner as in example 1, except that a preheated MDR rheometer set at the temperature of 185° C. is used.

Figure 5:
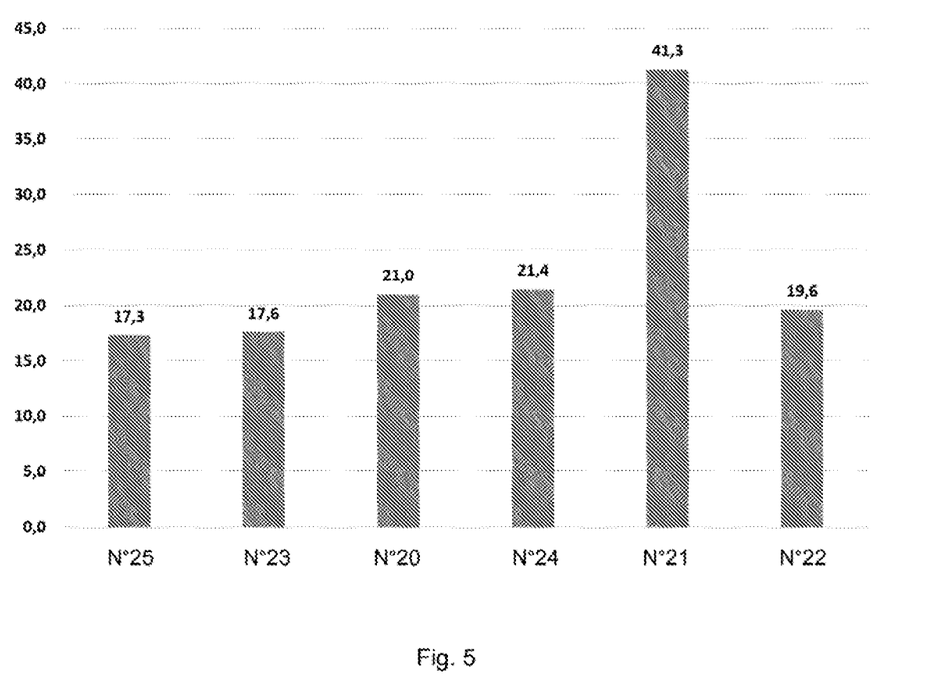
FIG. 5 shows a histogram of the torque, measured by an MDR rheometer, at 185° C., during the crosslinking of the compositions no. 20, no. 21, no. 22, no. 23, no. 24 and no. 25 described in example 3. The difference (MH-ML) between the maximum torque MH and the minimum torque ML, in dN m is on the ordinate.
Figure 6:
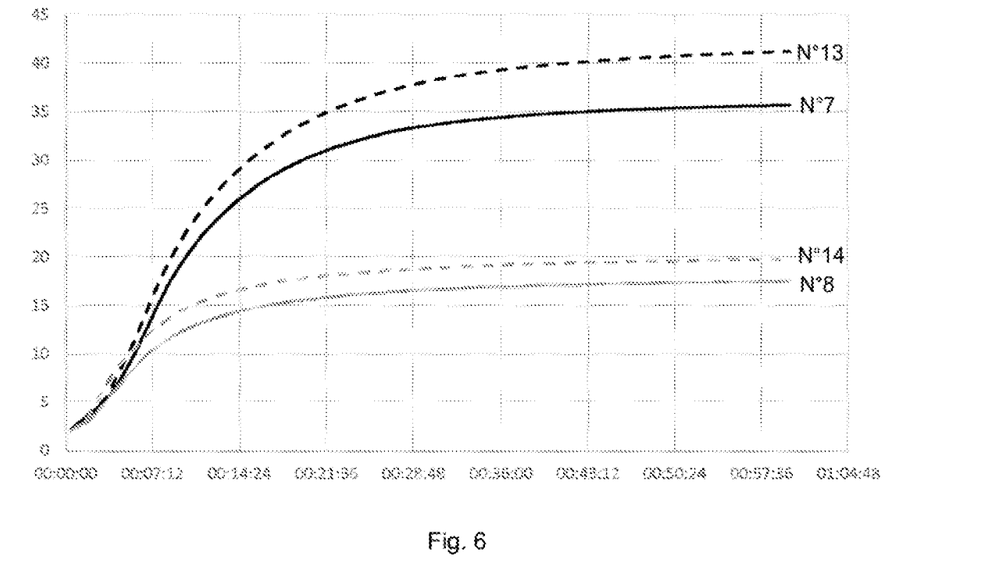
FIG. 6 shows the rheometric curves obtained by an RPA 2000 rheometer, at 160° C., during the crosslinking of compositions no. 7, no. 8, no. 13 and no. 14 described in examples 1. The time (in h:min:s) is on the abscissa and the torque S', in dN m, is on the ordinate.

The results are summarised in FIG. 5, as well as in the table below:

| Composition no | 20 | 21 | 22 | 23 | 24 | 25 |
|---|---|---|---|---|---|---|
| ML (dN m) | 1.326 | 1.541 | 1.541 | 1.159 | 0.955 | 1.179 |
| MH (dN m) | 22.31 | 42.8 | 21.12 | 18.72 | 22.39 | 18.47 |
| T'90 (h:min:s) | 00:03:32 | 00:02:34 | 00:03:43 | 00:03:18 | 00:03:15 | 00:03:34 |
| Ts2 (h:min:s) | 00:00:23 | 00:00:16 | 00:00:23 | 00:00:23 | 00:00:22 | 00:00:25 |
| MH − ML (dN m) | 21.0 | 41.3 | 19.6 | 17.6 | 21.4 | 17.3 |

Compositions 20 and 21 respectively have a higher crosslinking density than compositions 23 and 24, which correspond to the same compositions without magnesium oxide.

Example 4

In this example, the effect of magnesium oxide on the crosslinking density and rate was compared with that of zinc oxide. The following compositions were prepared:

| Composition no | 26 | 27 | 28 | 29 |
|---|---|---|---|---|
| BR (phr) | 100 | 100 | 100 | 100 |
| Carbon black N234 (phr) | 25 | 25 | 25 | 25 |
| Zinc dimethacrylate (phr) | 20 | 20 | 20 | 20 |
| Zinc oxide (phr) | — | 2 | 15 | — |
| Dicumyl peroxide (phr) | 0.9 | 0.9 | 0.9 | 0.9 |
| Magnesium oxide (phr) | 15 | 15 | — | — |

The compositions were prepared in the same manner as in example 1.

Compositions 26 and 27 illustrate the use of magnesium oxide according to the invention, compositions 28 to 29 correspond to comparative examples.

The crosslinking density and rate are evaluated as follows.

A disc about 3.5 cm in diameter is cut from the plate of the mixture to be tested. It is placed between two sheets of Mylar-type polymer then the whole is placed in the test cavity of the MDR rheometer already preheated to the test temperature and adjusted according to the following parameters:
Temperature: 160° C.;
Oscillation amplitude: 0.5°;
Oscillation frequency: 1.667 Hz;
Time: 60 min.

The test is started immediately and the measurements are automatically recorded by the computer connected to the instrument.

Figure 7:
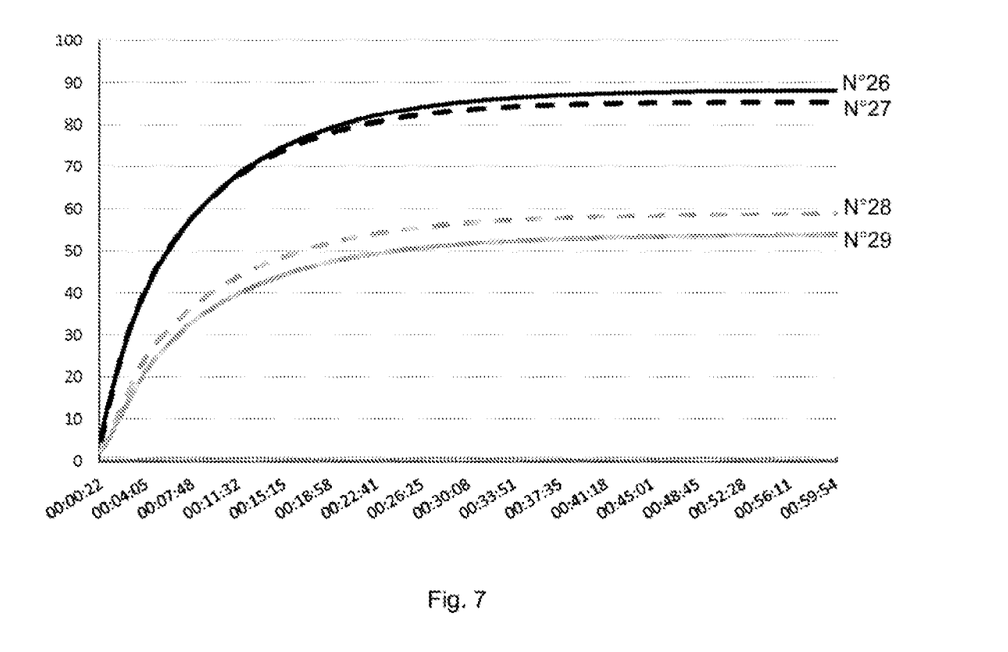
FIG. 7 shows the rheometric curves obtained by an MDR rheometer, at 160° C., during the crosslinking of compositions no. 26, no. 27, no. 28 and no. 29 described in examples 4. The time (in h:min:s) is on the abscissa and the torque S', in dN m, is on the ordinate.

The results are summarised in FIG. 7, as well as in the table below:

| Composition no | 26 | 27 | 28 | 29 |
|---|---|---|---|---|
| ML (dN m) | 3.447 | 3.437 | 2.246 | 2.012 |
| MH (dN m) | 88.23 | 85.51 | 58.92 | 53.95 |
| T'90 (h:min:s) | 00:19:36 | 00:18:07 | 00:20:57 | 00:21:19 |
| Ts2 (h:min:s) | 00:00:19 | 00:00:24 | 00:00:43 | 00:00:47 |
| MH − ML (dN m) | 84.8 | 82.1 | 56.7 | 51.9 |

Compositions containing magnesium oxide have an increased crosslinking density and rate compared to the composition containing zinc oxide. Particularly, composition 26 allows to obtain a higher crosslinking density and crosslinking rate compared to composition 28 which corresponds to the same composition as composition 26 but with zinc oxide instead of magnesium oxide (in the same proportion).

It can also be noted that the addition of zinc oxide (composition 28) slightly increases the crosslinking density and the crosslinking rate compared to the same composition without metal oxide (composition 29). However, this very weak effect is probably only due to a reinforcing effect of zinc oxide.

The invention claimed is:

1. A method for increasing crosslinking rate and/or crosslinking density of at least one crosslinkable polymer comprising crosslinking the at least one crosslinkable polymer in the presence of magnesium oxide, wherein the crosslinking of the crosslinkable polymer is carried out in the presence of:
a crosslinking co-agent and
an organic peroxide.

2. The method according to claim 1, wherein the crosslinkable polymer is free of chlorine functional groups and of carboxylic acid functional groups.

3. The method according to claim 1, wherein the crosslinkable polymer is selected from the group consisting of diene elastomers, saturated polyolefins, silicones, fluorinated elastomers, ethylene-vinyl acetate copolymers, ethylene methyl (meth)acrylate copolymers, ethylene-glycidyl methacrylate copolymers and/or mixtures thereof.

4. The method according to claim 1, wherein the organic peroxide is selected from dicumyl peroxide, aryl or diaryl peroxides, diacetyl peroxide, benzoyl peroxide, dibenzoyl peroxide, ditertbutyl peroxide, tertbutylcumyl peroxide, 2,5-bis(tert-butylperoxy)-2,5-dimethylhexane, n-butyl-4,4'-di(tert-butylperoxy) valerate, OO-(t-butyl)-O-(2-ethylhexyl) monoperoxycarbonate, tert-butyl peroxyisopropylcarbonate, tert-butyl peroxybenzoate, tert-butyl peroxy-3,5,5-trimethylhexanoate, 1,3(4)-bis(tert-butylperoxyisopropyl)benzene and mixtures thereof.

5. The method according to claim 1, wherein the cross-linking co-agent comprises a (meth)acrylate compound, in the form of a metal salt, or an ester or in a polymeric form.

6. The method according to claim 5, wherein the metal salt is zinc diacrylate or zinc dimethacrylate.

7. The method according to claim 1, wherein the cross-linking co-agent is present in a mass quantity of 5 to 50 phr.

8. The method according to claim 1, wherein the organic peroxide is present in a mass quantity from 0.1 to 10 phr.

9. The method according to claim 1, wherein the magnesium oxide is present in a mass quantity from 1 to 50 phr.

10. The method according to claim 1, wherein the magnesium oxide has a BET specific surface area ranging from 1 to 200 $m^2/g$.

11. The method according to claim 1, wherein the magnesium oxide has a BET specific surface area greater than 25 $m^2/g$.

12. The method according to claim 1, wherein the cross-linking of the crosslinkable polymer is carried out in the presence of a reinforcing filler.

13. The method according to claim 1, wherein the cross-linking of the crosslinkable polymer is carried out in the presence of a processing agent and/or in the presence of a plasticiser, an antioxidant, a stabiliser or a mixture thereof.

14. The method according to claim 1, wherein the cross-linking density is greater than 1.5 times the crosslinking density obtained under the same crosslinking conditions but in the absence of magnesium oxide.

15. The method according to claim 1, wherein the cross-linking rate is greater than 1.1 times the crosslinking rate obtained under the same crosslinking conditions but in the absence of magnesium oxide.

16. A method of manufacturing hoses, pipes, seals, O-rings, transmission belts, engine mounts, anti-vibration systems, window profiles, car body and window sealing profiles, insulators for electric cables, shoe soles, rubber mats, conveyor belts or golf balls, that includes the method according to claim 1.

* * * * *